United States Patent
Lewis et al.

(10) Patent No.: US 11,029,027 B2
(45) Date of Patent: Jun. 8, 2021

(54) DILUTION/EFFUSION HOLE PATTERN FOR THICK COMBUSTOR PANELS

(71) Applicant: UNITED TECHNOLOGIES CORPORATION, Farmington, CT (US)

(72) Inventors: Scott D. Lewis, Vernon, CT (US); James B. Hoke, Tolland, CT (US); Jeffrey Jay Lienau, Wethersfield, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 440 days.

(21) Appl. No.: 16/151,160

(22) Filed: Oct. 3, 2018

(65) Prior Publication Data

US 2020/0109854 A1    Apr. 9, 2020

(51) Int. Cl.
| | |
|---|---|
| *F23R 3/06* | (2006.01) |
| *F23M 5/08* | (2006.01) |
| *F02C 3/14* | (2006.01) |
| *F02K 3/06* | (2006.01) |
| *F23R 3/00* | (2006.01) |

(52) U.S. Cl.
CPC ................. *F23M 5/08* (2013.01); *F02C 3/14* (2013.01); *F02K 3/06* (2013.01); *F23R 3/002* (2013.01); *F23R 3/06* (2013.01); *F05D 2240/35* (2013.01); *F05D 2260/202* (2013.01); *F23R 2900/03042* (2013.01)

(58) Field of Classification Search
CPC ................................. F23R 2900/03041–03045
See application file for complete search history.

(56) References Cited

U.S. PATENT DOCUMENTS

| | | |
|---|---|---|
| 5,775,108 A | 7/1998 | Ansart et al. |
| 7,093,439 B2 | 8/2006 | Pacheco-Tougas et al. |
| 7,905,094 B2 | 3/2011 | Dudebout et al. |
| 8,091,367 B2 | 1/2012 | Alkabie |
| 2003/0182942 A1 | 10/2003 | Gerendas |
| 2007/0130953 A1* | 6/2007 | Burd ................. F23R 3/06 60/772 |
| 2009/0133404 A1 | 5/2009 | Lai et al. |
| 2010/0011773 A1* | 1/2010 | Suleiman .......... F23R 3/06 60/752 |
| 2014/0260257 A1 | 9/2014 | Rullaud et al. |

(Continued)

FOREIGN PATENT DOCUMENTS

FR     3021097     11/2015

OTHER PUBLICATIONS

European Patent Office, European Search Report dated Jan. 30, 2020 in Application No. 19201037.9.

*Primary Examiner* — Steven M Sutherland
(74) *Attorney, Agent, or Firm* — Snell & Wilmer L.L.P.

(57) ABSTRACT

A combustor panel may comprise a dilution hole, a plurality of film cooling holes each of the plurality comprising an inlet and an outlet, a first group of the plurality of film cooling holes arranged circumferentially about the dilution hole, wherein each of film cooling holes of the first group have a first outlet angle oriented radially toward the center of the dilution hole, and a second group of the plurality of film cooling holes arranged radially outward of the first group and relatively circumferentially between the first group.

17 Claims, 8 Drawing Sheets

(56) References Cited

U.S. PATENT DOCUMENTS

| | | | |
|---|---|---|---|
| 2015/0354819 A1* | 12/2015 | Snyder | F02C 7/18 |
| | | | 60/782 |
| 2015/0369487 A1* | 12/2015 | Dierberger | F01D 25/30 |
| | | | 60/772 |
| 2016/0025342 A1* | 1/2016 | Erbas-Sen | F02C 7/18 |
| | | | 60/772 |
| 2016/0201913 A1* | 7/2016 | Tu | F23R 3/002 |
| | | | 60/755 |
| 2016/0238250 A1 | 8/2016 | Moura et al. | |
| 2016/0256957 A1* | 9/2016 | Ivory | B23K 26/144 |
| 2016/0265777 A1* | 9/2016 | Hoke | F23R 3/002 |
| 2016/0281988 A1* | 9/2016 | Tu, Jr. | F23R 3/002 |
| 2016/0290644 A1* | 10/2016 | Cunha | F23R 3/002 |
| 2018/0142563 A1 | 5/2018 | Commaret et al. | |
| 2018/0231252 A1 | 8/2018 | Clemen | |

\* cited by examiner

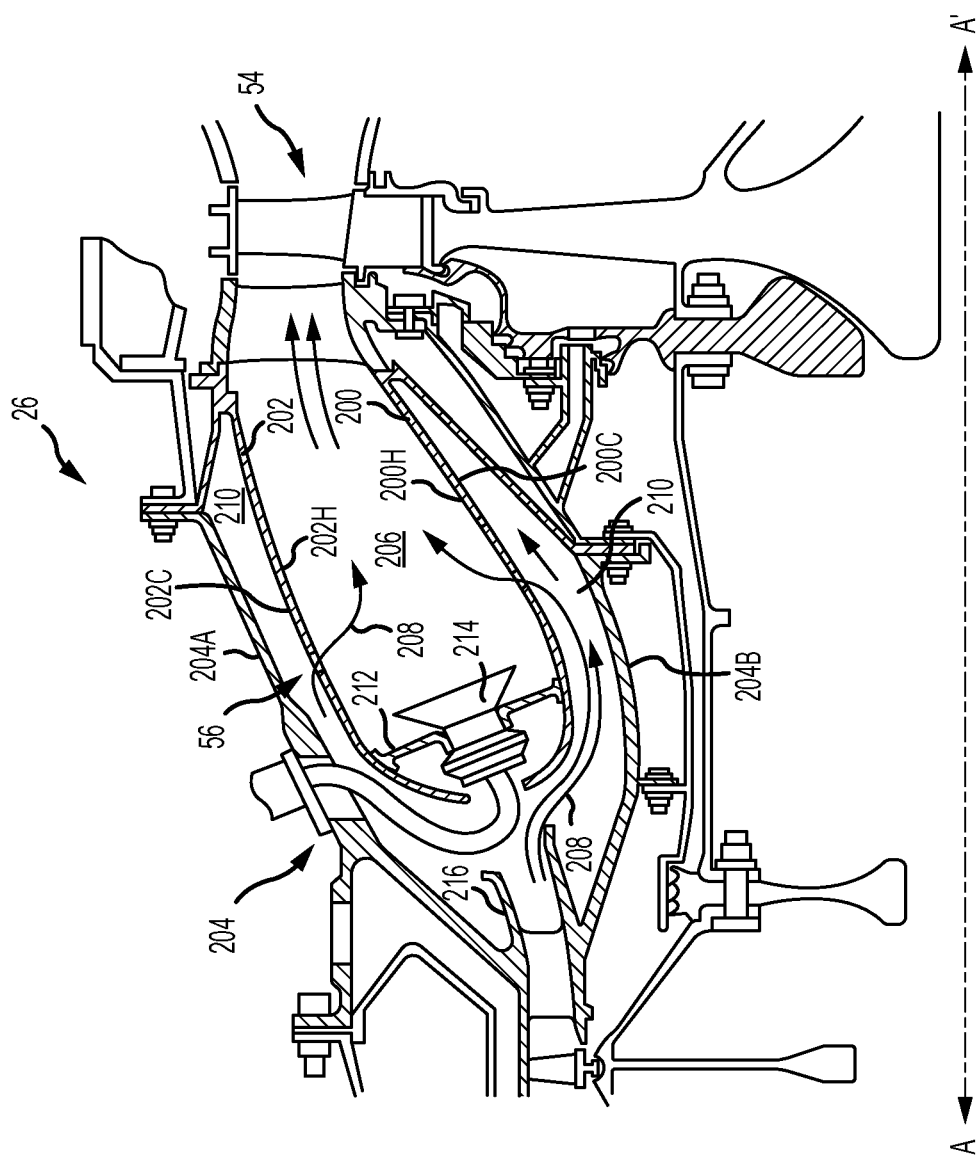

DILUTION/EFFUSION HOLE PATTERN FOR THICK COMBUSTOR PANELS

FIELD

The disclosure relates generally to dilution holes in gas turbine engines.

BACKGROUND

Combustor temperatures in gas turbine engines can reach extreme highs. The air temperature in a combustor often exceeds the melting point of the combustor liner. Combustors often have "dilution holes" in the liner. Dilution holes allow combustors to operate at conditions that minimize emissions generated during the combustion process. In addition, dilution holes promote mixing within the combustion chamber, which serves to condition the flow entering the turbine. Combustion dilution holes are often disposed at locations that are difficult to cool. The dilution holes may also have separations within the dilution holes that tend to entrain hot gas produce and localized hot spots. The hot spots can damage the dilution holes themselves, as well as the surrounding combustor liner.

SUMMARY

A combustor panel is provided according to various embodiments. The combustor panel may comprise a dilution hole, a plurality of film cooling holes, wherein each of the film cooling holes in the plurality of film cooling holes comprise an inlet and an outlet, a first group of the plurality of film cooling holes arranged circumferentially about the dilution hole, wherein each the outlets of the film cooling holes of the first group are oriented radially toward the center of the dilution hole, and a second group of the plurality of film cooling holes arranged radially outward of the first group and relatively circumferentially between the first group.

In various embodiments, each of the outlets of the film cooling holes of the first group have a first outlet angle defined between a centerline bisecting the outlet and a radius of the dilution hole intersecting a center of the respective outlet, wherein 80% of the outlets of the film cooling holes of the first group have the first outlet angle of not more than 25° away from the radius. In various embodiments, the first group further comprises first set holes upstream of the dilution hole and second set holes downstream of the dilution hole characterized in that the first set holes have a greater surface concentration than the second set holes. In various embodiments, the second group of the plurality of film cooling holes are arranged relatively between the second set holes, each of the plurality of film cooling holes of the second group having a second outlet angle oriented in a circumferential direction relatively toward a tangent to a proximate point on the circumference of the dilution hole. In various embodiments, the second outlet angle is not more than 25° away from the tangent of the proximate point. In various embodiments, the second group of the plurality of film cooling holes comprises third set holes and fourth set holes, wherein the third set holes are located radially outward of the first set holes and circumferentially between the second set holes and the fourth set holes, wherein the second set holes have a first surface angle between 20° and 75°, wherein the third set holes have a second surface angle between 25° and 65°, and wherein the fourth set holes have a third surface angle between 20° and 70°. In various embodiments, the combustor panel further comprises a third group of the plurality of film cooling holes arranged downstream of the second group comprising fifth set holes arranged radially outward of the second group and oriented in a circumferential direction relatively toward the respective tangent of the respective proximate point on the circumference of the dilution hole, wherein the third group further comprises a plurality of subsequent set holes each radially outward of the respectively previous set holes, wherein each of the subsequent set holes are characterized by a gradual turning of the respective outlet angle from the respective tangent toward the downstream direction.

A combustor assembly is also provided according to various embodiments. The combustor assembly includes an inner annular wall, an outer annular wall about the inner annular wall, a dome joining the inner annular wall and the outer annular wall, wherein each of the inner annular wall and the outer annular wall comprise a hot surface defining a combustion chamber therebetween, and a dilution hole through the hot surface in fluid communication with a respective cold surface, a plurality of film cooling holes, wherein each of the film cooling holes in the plurality of film cooling holes comprise an inlet on the respective cold surface in fluid communication with an outlet on the respective hot surface, a first group of the plurality of film cooling holes arranged circumferentially about the dilution hole, wherein each of the outlets of the film cooling holes of the first group are oriented radially toward the center of the dilution hole, and a second group of the plurality of film cooling holes arranged radially outward of the first group and relatively circumferentially between the first group.

In various embodiments, each of the outlets of the film cooling holes of the first group have a first outlet angle defined between a centerline bisecting the outlet and a radius of the dilution hole intersecting a center of the respective outlet, wherein 80% of the outlets of the film cooling holes of the first group have the first outlet angle of not more than 25° away from the radius. In various embodiments, the first group further comprises first set holes upstream of the dilution hole and second set holes downstream of the dilution hole characterized in that the first set holes have a greater surface concentration than the second set holes. In various embodiments, the second group of the plurality of film cooling holes are arranged relatively between the second set holes, each of the plurality of film cooling holes of the second group having a second outlet angle oriented in a circumferential direction relatively toward a tangent to a proximate point on the circumference of the dilution hole. In various embodiments, the second outlet angle is not more than 25° away from the tangent of the proximate point. In various embodiments, the second group of the plurality of film cooling holes comprises third set holes and fourth set holes, wherein the third set holes are located radially outward of the first set holes and circumferentially between the second set holes and the fourth set holes, wherein the second set holes have a first surface angle between 20° and 75°, wherein the third set holes have a second surface angle between 25° and 65°, and wherein the fourth set holes have a third surface angle between 20° and 70°. In various embodiments, the combustor assembly further comprises a third group of the plurality of film cooling holes arranged downstream of the second group comprising fifth set holes arranged radially outward of the second group and oriented in a circumferential direction relatively toward the respective tangent of the respective proximate point on the circumference of the dilution hole, wherein the third group further comprises a plurality of downstream set holes each radially outward of the respectively upstream set holes, wherein each of the downstream set holes are characterized by a gradual turning of the respective outlet angle from the respective tangent toward the downstream direction.

A gas turbine engine is further provided according to various embodiments. The gas turbine engine may include a compressor section configured to compress a gas, a combustor section aft of the compressor section and configured to combust the gas, and a turbine section aft of the combustor section and configured to extract energy from the combusted gas. The combustor section may comprise a combustor panel comprising a dilution hole, a plurality of film cooling holes, wherein each of the film cooling holes in the plurality of film cooling holes comprise an inlet and an outlet, a first group of the plurality of film cooling holes arranged circumferentially about the dilution hole, wherein each of the outlets of the film cooling holes of the first group have are oriented radially toward the center of the dilution hole, and a second group of the plurality of film cooling holes arranged radially outward of the first group and relatively circumferentially between the first group.

In various embodiments, each of the outlets of the film cooling holes of the first group have a first outlet angle defined between a centerline bisecting the outlet and a radius of the dilution hole intersecting a center of the respective outlet, wherein 80% of the outlets of the film cooling holes of the first group have the first outlet angle of not more than 25° away from the radius. In various embodiments, the first group further comprises first set holes upstream of the dilution hole and second set holes downstream of the dilution hole characterized in that the first set holes have a greater surface concentration than the second set holes. In various embodiments, the second group of the plurality of film cooling holes are arranged relatively between the second set holes, each of the plurality of film cooling holes of the second group having a second outlet angle oriented in a circumferential direction relatively toward a tangent to a proximate point on the circumference of the dilution hole, wherein the second outlet angle is not more than 25° away from the tangent of the proximate point. In various embodiments, the second group of the plurality of film cooling holes comprises third set holes and fourth set holes, wherein the third set holes are located radially outward of the first set holes and circumferentially between the second set holes and the fourth set holes, wherein the second set holes have a first surface angle between 20° and 75°, wherein the third set holes have a second surface angle between 25° and 65°, and wherein the fourth set holes have a third surface angle between 20° and 70°. In various embodiments, the combustor panel further comprises a third group of the plurality of film cooling holes arranged downstream of the second group comprising fifth set holes arranged radially outward of the second group and oriented in a circumferential direction relatively toward the respective tangent of the respective proximate point on the circumference of the dilution hole, wherein the third group further comprises a plurality of downstream set holes each radially outward of the respectively upstream set holes, wherein each of the downstream set holes are characterized by a gradual turning of the respective outlet angle from the respective tangent toward the downstream direction.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosures, however, may best be obtained by referring to the detailed description and claims when considered in connection with the drawing figures, wherein like numerals denote like elements.

FIG. 2A illustrates a cross-section of a combustor, in accordance with various embodiments;

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the disclosures, it should be understood that other embodiments may be realized and that logical, chemical, and mechanical changes may be made without departing from the spirit and scope of the disclosures. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Figure 1:
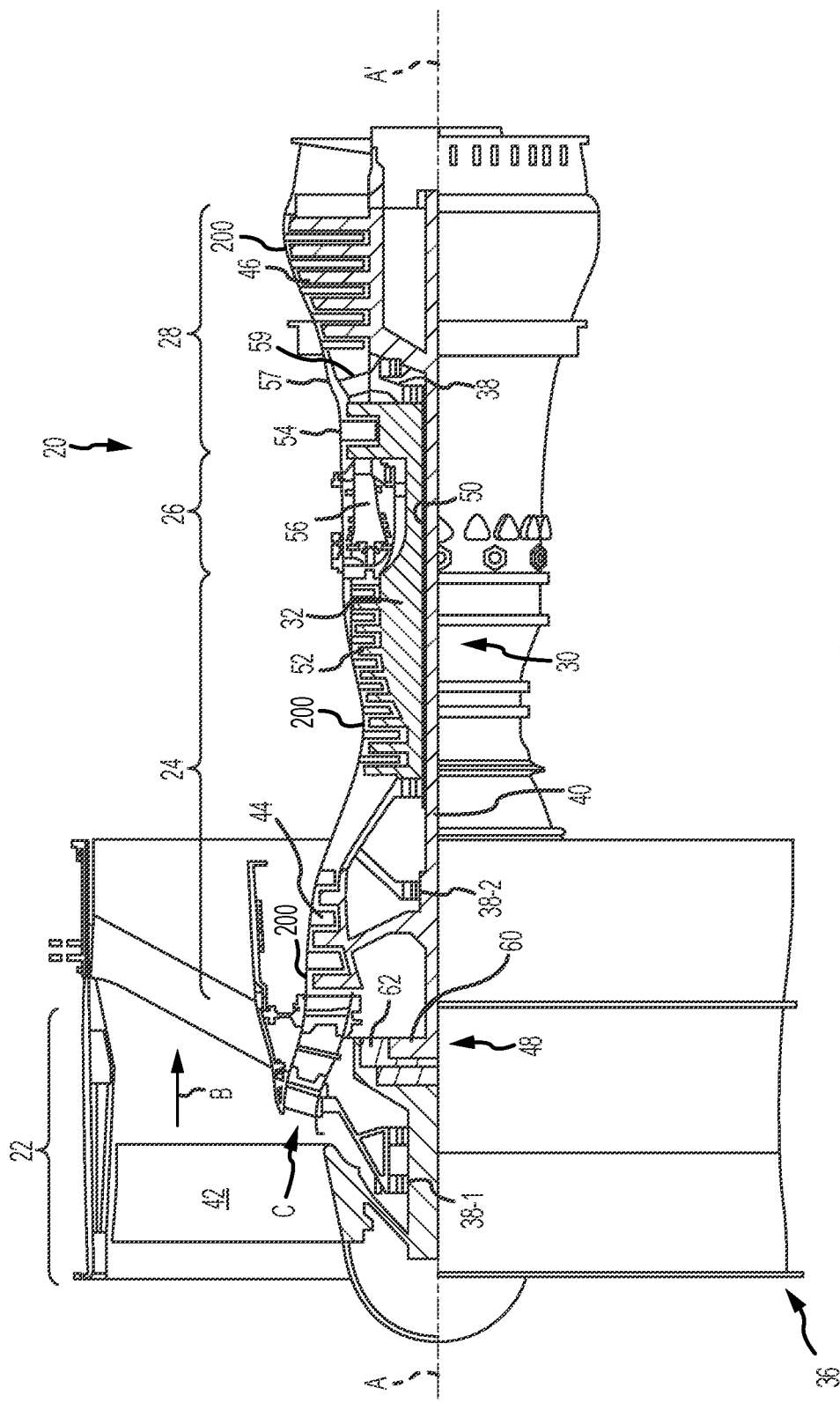
FIG. 1 illustrates an exemplary gas turbine engine, in accordance with various embodiments.

In various embodiments and with reference to FIG. 1, a gas turbine engine 20 is provided. Gas turbine engine 20 may be a two-spool turbofan that generally incorporates a fan section 22, a compressor section 24, a combustor section 26 and a turbine section 28. In operation, fan section 22 can drive air along a bypass flow-path B while compressor section 24 can drive air for compression and communication into combustor section 26 then expansion through turbine section 28. Although depicted as a turbofan gas turbine engine 20 herein, it should be understood that the concepts described herein are not limited to use with turbofans as the teachings may be applied to other types of turbine engines including turbojet engines, a low-bypass turbofans, a high bypass turbofans, or any other gas turbine known to those skilled in the art.

Gas turbine engine 20 may generally comprise a low speed spool 30 and a high speed spool 32 mounted for rotation about an engine central longitudinal axis A-A' relative to an engine static structure 36 via one or more bearing systems 38 (shown as bearing system 38-1 and bearing system 38-2). It should be understood that various bearing systems 38 at various locations may alternatively or additionally be provided, including for example, bearing system 38, bearing system 38-1, and bearing system 38-2.

Low speed spool 30 may generally comprise an inner shaft 40 that interconnects a fan 42, a low pressure (or first) compressor section 44 (also referred to a low pressure compressor) and a low pressure (or first) turbine section 46. Inner shaft 40 may be connected to fan 42 through a geared architecture 48 that can drive fan 42 at a lower speed than low speed spool 30. Geared architecture 48 may comprise a gear assembly 60 enclosed within a gear housing 62. Gear assembly 60 couples inner shaft 40 to a rotating fan structure. High speed spool 32 may comprise an outer shaft 50 that interconnects a high pressure compressor ("HPC") 52 (e.g., a second compressor section) and high pressure (or second) turbine section 54. A combustor 56 may be located between HPC 52 and high pressure turbine 54. A mid-turbine frame 57 of engine static structure 36 may be located generally between high pressure turbine 54 and low pressure turbine 46. Mid-turbine frame 57 may support one or more bearing systems 38 in turbine section 28. Inner shaft 40 and outer shaft 50 may be concentric and rotate via bearing systems 38 about the engine central longitudinal axis A-A', which is collinear with their longitudinal axes. As used herein, a "high pressure" compressor or turbine experiences a higher pressure than a corresponding "low pressure" compressor or turbine.

The core airflow C may be compressed by low pressure compressor 44 then HPC 52, mixed and burned with fuel in combustor 56, then expanded over high pressure turbine 54 and low pressure turbine 46. Mid-turbine frame 57 includes airfoils 59 which are in the core airflow path. Low pressure turbine 46, and high pressure turbine 54 rotationally drive the respective low speed spool 30 and high speed spool 32 in response to the expansion.

Gas turbine engine 20 may be, for example, a high-bypass geared aircraft engine. In various embodiments, the bypass ratio of gas turbine engine 20 may be greater than about six (6). In various embodiments, the bypass ratio of gas turbine engine 20 may be greater than ten (10). In various embodiments, geared architecture 48 may be an epicyclic gear train, such as a star gear system (sun gear in meshing engagement with a plurality of star gears supported by a carrier and in meshing engagement with a ring gear) or other gear system. Geared architecture 48 may have a gear reduction ratio of greater than about 2.3 and low pressure turbine 46 may have a pressure ratio that is greater than about 5. In various embodiments, the bypass ratio of gas turbine engine 20 is greater than about ten (10:1). In various embodiments, the diameter of fan 42 may be significantly larger than that of the low pressure compressor 44, and the low pressure turbine 46 may have a pressure ratio that is greater than about (5:1). Low pressure turbine 46 pressure ratio may be measured prior to inlet of low pressure turbine 46 as related to the pressure at the outlet of low pressure turbine 46 prior to an exhaust nozzle. It should be understood, however, that the above parameters are exemplary of various embodiments of a suitable geared architecture engine and that the present disclosure contemplates other gas turbine engines including direct drive turbofans.

In various embodiments, the next generation of turbofan engines may be designed for higher efficiency which is associated with higher pressure ratios and higher temperatures in the HPC 52. These higher operating temperatures and pressure ratios may create operating environments that may cause thermal loads that are higher than the thermal loads encountered in conventional turbofan engines, which may shorten the operational life of current components.

In various embodiments, HPC 52 may comprise alternating rows of rotating rotors and stationary stators. Stators may have a cantilevered configuration or a shrouded configuration. More specifically, a stator may comprise a stator vane, a casing support and a hub support. In this regard, a stator vane may be supported along an outer diameter by a casing support and along an inner diameter by a hub support. In contrast, a cantilevered stator may comprise a stator vane that is only retained and/or supported at the casing (e.g., along an outer diameter).

In various embodiments, rotors may be configured to compress and spin a fluid flow. Stators may be configured to receive and straighten the fluid flow. In operation, the fluid flow discharged from the trailing edge of stators may be straightened (e.g., the flow may be directed in a substantially parallel path to the centerline of the engine and/or HPC) to increase and/or improve the efficiency of the engine and, more specifically, to achieve maximum and/or near maximum compression and efficiency when the straightened air is compressed and spun by rotor 64.

According to various embodiments and with reference now to FIG. 2A, combustor section 26 of gas turbine engine 20 is illustrated in cross-section. Combustor 56 is enclosed within combustor housing 204 which comprises an inboard wall 204a and an outboard wall 204b configured to contain high pressure gas from HPC 52 such as, for example, compressed air 208. Combustor 56 may comprise one or more combustor panels or liners such as first combustor panel 200 and second combustor panel 202. A transverse wall or dome 212 including a plurality of opening for fuel injectors 214 may join the first combustor panel 200 and the second combustor panel 202 at an upstream position proximate an outlet 216 of HPC 52 thereby forming a base of the a combustion chamber 206. Combustor 56 may be an annular combustor and the first combustor panel 200 may form an inner annular wall with the second combustor panel 202 forming an outer annular wall with each of the inner annular wall and outer annular wall extending along axis A-A' and defining the combustion chamber 206 therebetween. The first combustor panel 200 has a hot surface 200H oriented relatively toward the combustion chamber 206 and a cold surface 200C oriented relatively toward the inboard wall 204a of the combustor housing 204. In a like manner, the second combustor panel 202 has a hot surface 202H oriented relatively toward the combustion chamber 206 and a cold surface 202C oriented relatively toward the outboard wall 204b of the combustor housing 204. In various embodiments, the thickness of a combustor panel (between a hot surface and a cold surface of a panel) may be 0.055 in [1.397 mm] or greater.

Compressed air 208 flows from outlet 216 of HPC 52 downstream (as indicated by arrows) into the annular space 210 defined between the cold surfaces (200C, 202C) and their respective wall (204b, 204a) of the combustor housing 204. Each of the combustor panels comprise a number of openings extending through the cold surfaces (200C, 202C)

and their respective hot surfaces (200H, 202H) which permit compressed air 208 to enter combustion chamber 206 to be mixed with fuel from fuel injector 214 and combusted to exhaust downstream at the inlet of HPT 54. The combustion chamber 206 may be divided into one or more zones such as, for example, a combustion zone proximate fuel injector 214 and a dilution zone relatively downstream of the primary zone.

Figure 2B:
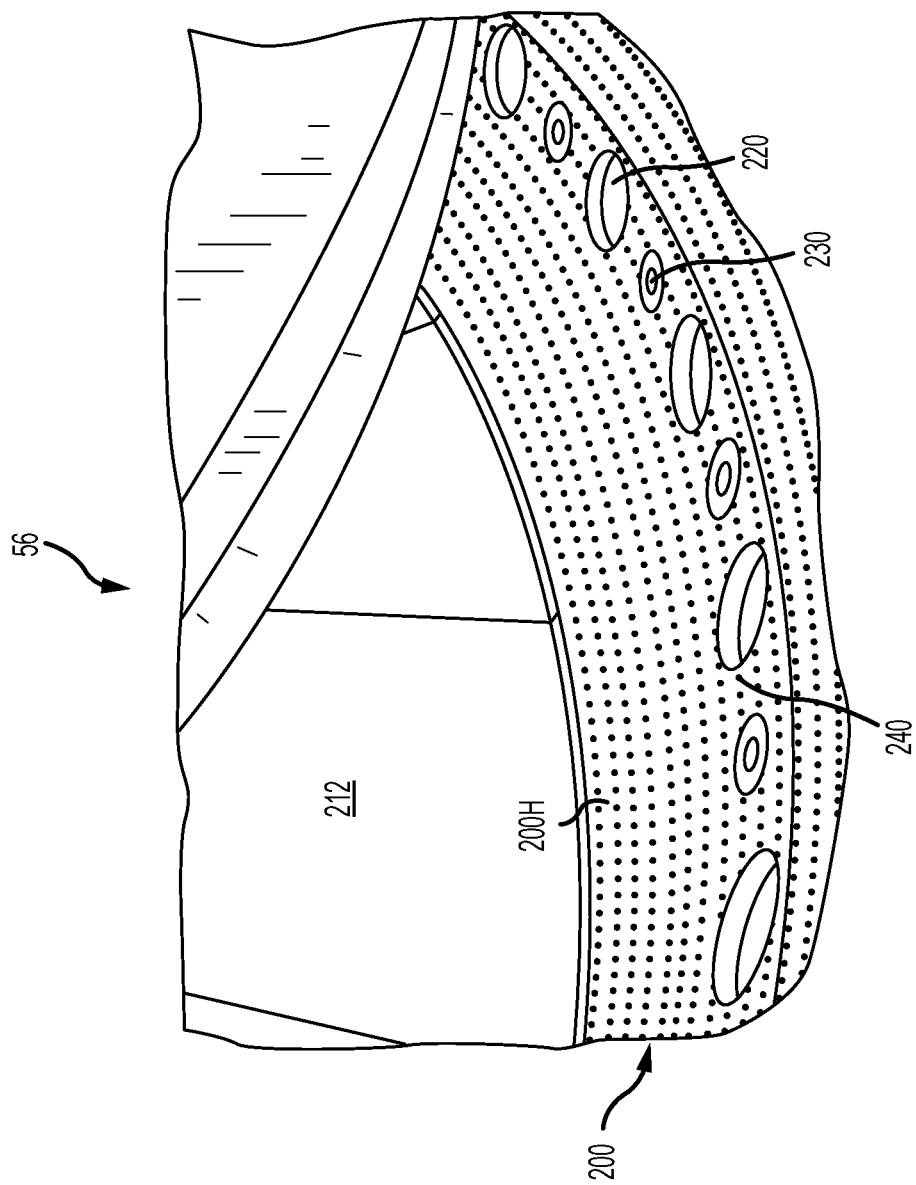
FIG. 2B illustrates a perspective view of combustor panel of a combustor, in accordance with various embodiments.

According to various embodiments and with reference to FIG. 2B, a section of first combustor panel 200 of combustor 56 is illustrated in perspective view of the hot surface 200H. The systems and apparatus disclosed herein may be configured to reduce the local temperatures in and about dilution holes such as major dilution holes 220 and minor dilution holes 230. Dilution holes 220 and 230 may be distributed on a surface such as, for example, a combustor panel to optimize combustion and reduce peak combustion temperatures for emissions purposes in zones within the combustor. Dilution holes are used to introduce additional compressed air into the combustion chamber with major dilution holes 220 introducing relatively more compressed air than minor dilution holes 230. This tends to ensure that the gas has combusted within the chamber and dilutes or distributes combusted gases around the combustor prior to entering the turbine. Dilution holes 220 and 230 thereby tend to promote combustion in the combustion zone, prevent combustion within the turbine, and tend to promote mixing of combustion gases that tends to reduce the temperature of hot streaks within the turbine. Dilution holes 220 and 230 may have an annular or elliptical geometry and may be formed integrally with, bonded to, or otherwise disposed in first combustor panel 200.

Figure 3A:
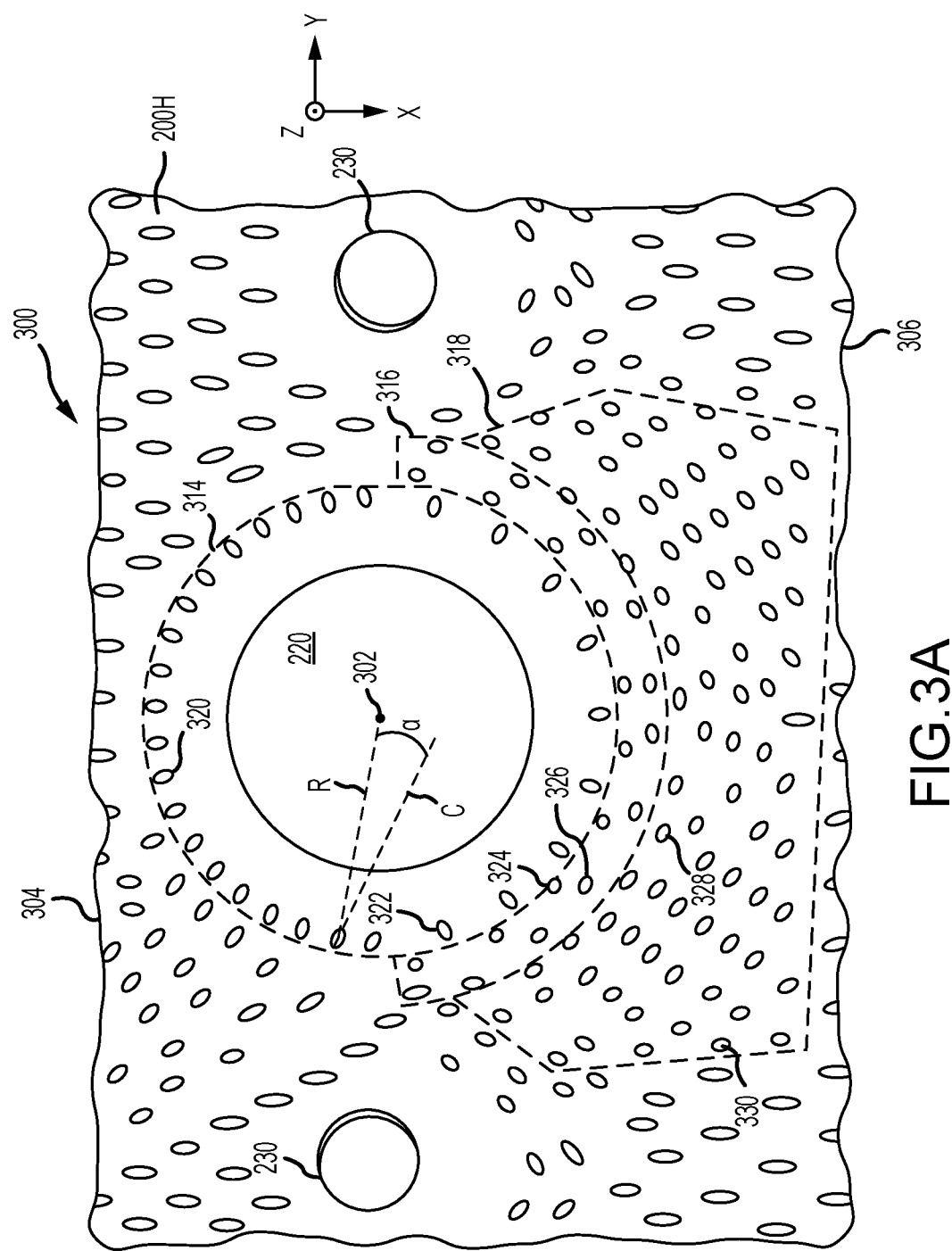
FIG. 3A illustrates a section of a combustor panel, in accordance with various embodiments.
Figure 3B:
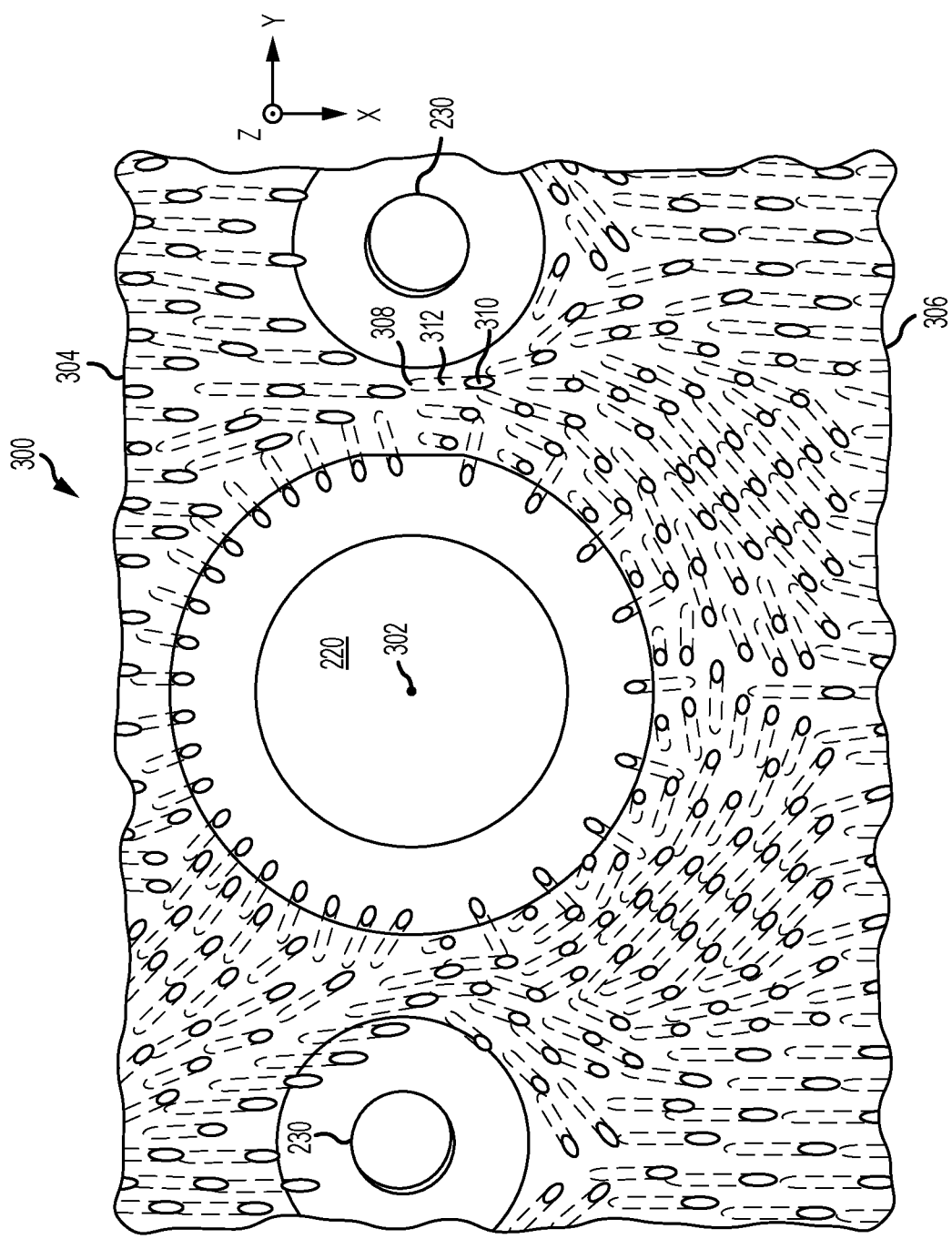
FIG. 3B illustrates a section of a combustor panel with the hot surface translucent for clarity, in accordance with various embodiments.

In various embodiments, a combustor panel such as first combustor panel 200 may include a plurality of film cooling holes 240 which, as shone more clearly with reference to FIGS. 3A and 3B, may be arranged in a pattern. Temperatures within combustion chamber 206 may be above 1700° F. and may tend to exceed the thermal-mechanical fatigue properties of the first combustor panel 200 material. A cooling fluid, such as compressed air 208, within annular space 210 may have a temperature between 200° and 1500° F. and may pass through the film cooling holes 240 from an inlet on the cold surface 200C through an outlet on the hot surface 200H, thereby establishing a film cooling effect over the hot surface 200H which tends to insulate the hot surface 200H from the high temperatures of the combustion chamber 206. First combustor panel 200 may tend to transfer heat to the cooling fluid as the fluid passes between the cold surface 200C and the hot surface 200H through the film cooling holes 240. In this regard, the film cooling hole heat transfer to the cooling fluid may further cool the first combustor panel 200. In various embodiments, the film cooling hole heat transfer may tend to increase as a function of the path distance between the inlet on the cold surface 200C and the outlet on the hot surface 200H. High temperatures (i.e. above 1700° F.) may also be present in the vicinity of the dilution holes 220 and 230. Uncombusted gasses which are introduced to air exiting the dilution holes 220 and 230 may further increase the temperatures at such locations. These increased temperatures may increase thermal strain and may lead to premature oxidization of the areas of the combustor panel surrounding the dilution holes 220 and 230. The effect of increased thermal-mechanical fatigue cracking and premature oxidation may tend to increase as combustor panel thickness decreases below 0.055 in [1.397 mm]. Therefore, a combustor panel may benefit from an increased thickness and increased concentration of film cooling holes 240 proximate the dilution holes 220 and 230.

Figure 3C:
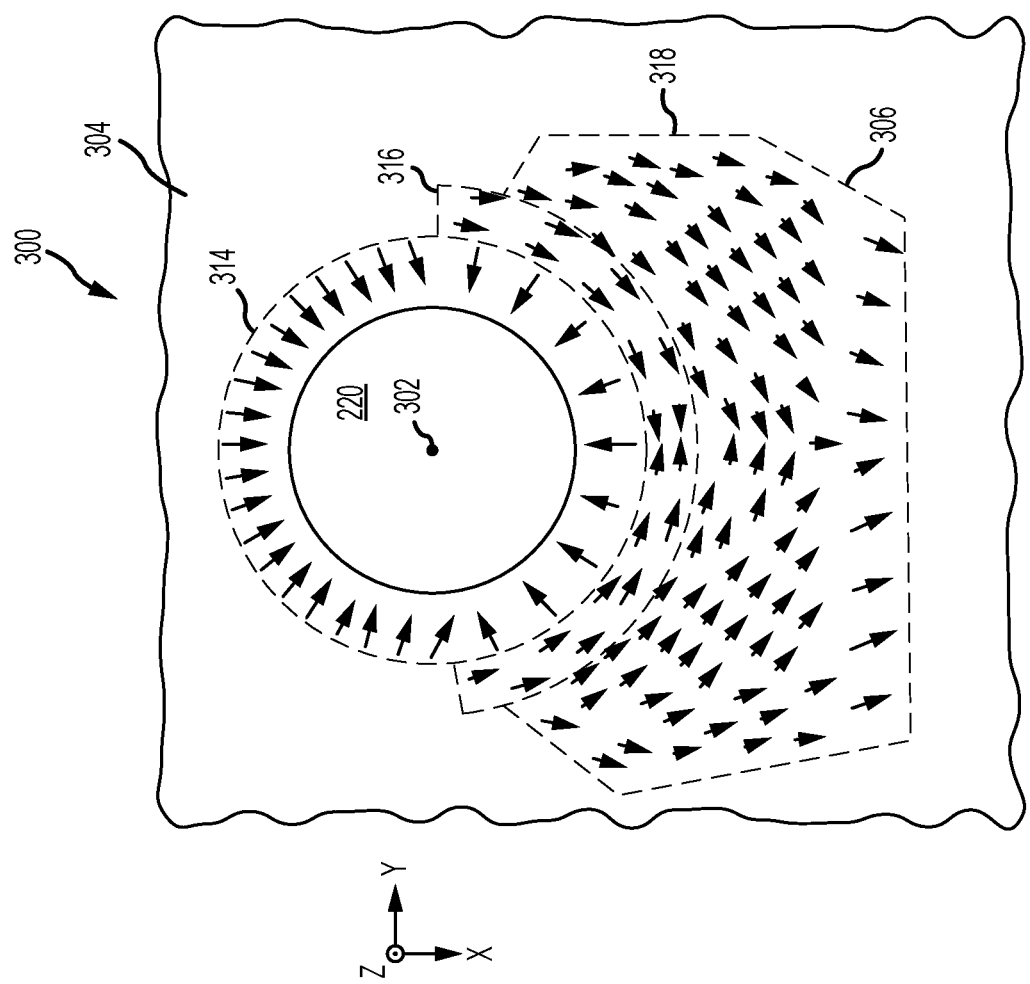
FIG. 3C illustrates an outlet flow field of a pattern of film cooling holes of a section of a combustor panel, in accordance with various embodiments.
Figure 3D:
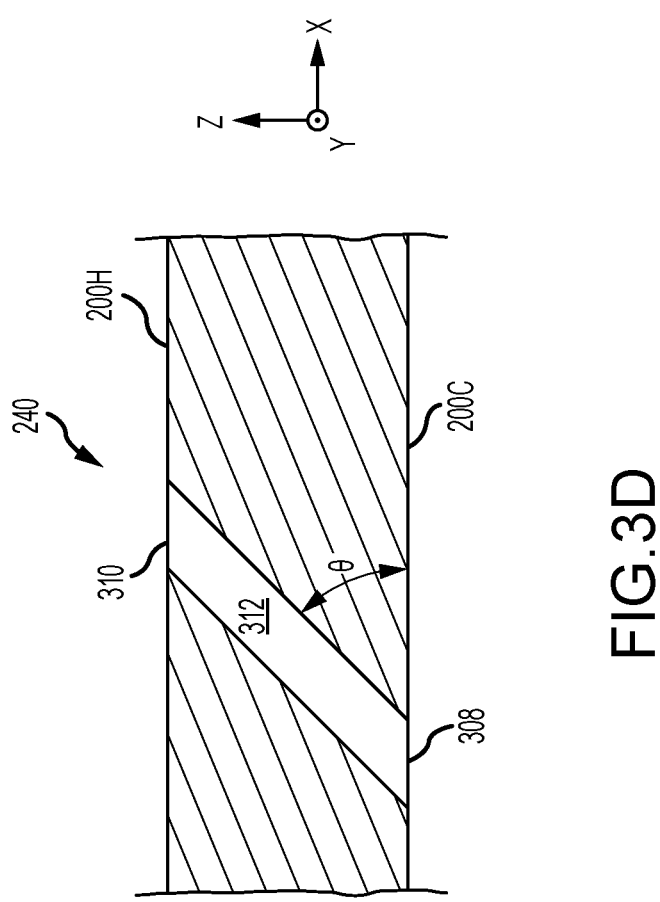
FIG. 3D illustrates a surface angle of a film cooling hole, in accordance with various embodiments.

In various embodiments and with additional reference to FIGS. 3A, 3B, 3C, 3D and 3E, a section 300 of first combustor panel 200 showing details of a pattern of film cooling holes 240 is illustrated as flattened, with the hot surface 200H coplanar to the provided X-Y plane of reference and viewed toward the hot surface 200H along the positive Z-axis which extends perpendicular to the page. FIG. 3B illustrates the same view with hot surface 200H, rendered translucent to reveal the structure of film cooling holes 240. Each of the film cooling holes 240 comprise an inlet 308 on the cold surface 200C and an outlet 310 on the hot surface 200H defining a passage 312 therebetween having an angle of inclination relative to the X-Y plane (i.e. a surface angle θ as shown in FIG. 3D). Major dilution hole 220 extends through the hot surface 200H and the cold surface 200C with major axis 302 at the center of the major dilution hole 220 parallel the Z-axis. Minor dilution holes 230 are arranged in similar regard to the major dilution hole 220. The primary flow field within the combustion chamber 206 is downstream flow i.e., following a velocity vector substantially parallel to the positive X-axis.

Stated another way, the primary flow field is from upstream edge 304 toward downstream edge 306 of section 300. The major dilution hole 220 flow is a jet flow with a velocity vector along major axis 302, substantially parallel the positive Z-axis (i.e., relatively out of the page) normal to the primary flow field. In this regard, the dilution hole jet flow may tend to disrupt the primary flow field around the jet flow and in response form a horseshoe shaped (generally U shaped) vortex. In a related manner, the dilution hole jet flow may tend to entrain the primary flow and form an arch shaped vortex within the horseshoe vortex on the downstream side of the dilution hole jet flow. The interaction of these vortexes with hot surface 200H tend to increase thermal-mechanical fatigue.

Film cooling holes 240 may be arranged in a pattern about a dilution hole such as major dilution hole 220 which tends to disrupt the complex vortex flow field and decrease thermal mechanical fatigue at the dilution hole. The pattern is defined by a first group 314, a second group 316, and a third group 318 of film cooling holes with each group having a particular surface angle. In various embodiments, each of the first group 314, the second group 316 and the third group comprise a particular outlet angle configured to produce an outlet flow field as illustrated in FIG. 3C. Each of the arrows in FIG. 3C is representative of an X-Y projection of a vector of an individual film cooling hole outlet flow.

First group 314 comprises film cooling holes located circumferentially about the major dilution hole 220. Each of the outlets of the first group 314 film cooling holes are oriented radially toward the center of the major dilution hole 220 (i.e., major axis 302). In various embodiments, each first group 314 film cooling holes have a first outlet angle α defined in the X-Y plane between a centerline C bisecting the outlet and a radius R of the major dilution hole 220 intersecting a center of the outlet. In this regard, where the first outlet angle is zero, the outlet (and corresponding outlet flow vector) is directed at the major axis 302. In various embodiments, the first outlet angle may deviate from the radius passing through the respective outlet by up to 250. Stated another way, the angle α may be not more than 25°. In various embodiments, 80% of the first group 314 film cooling holes have angle α not more than 25°. First group 314 may include first set holes 320 relatively upstream of the major dilution hole 220 and second set holes 322 on the downstream side of the major dilution hole 220 where the first set holes 320 have a greater surface concentration than the second set holes 322. In various embodiments, the second set holes 322 have a surface angle between 20° and 75°.

Figure 3E:
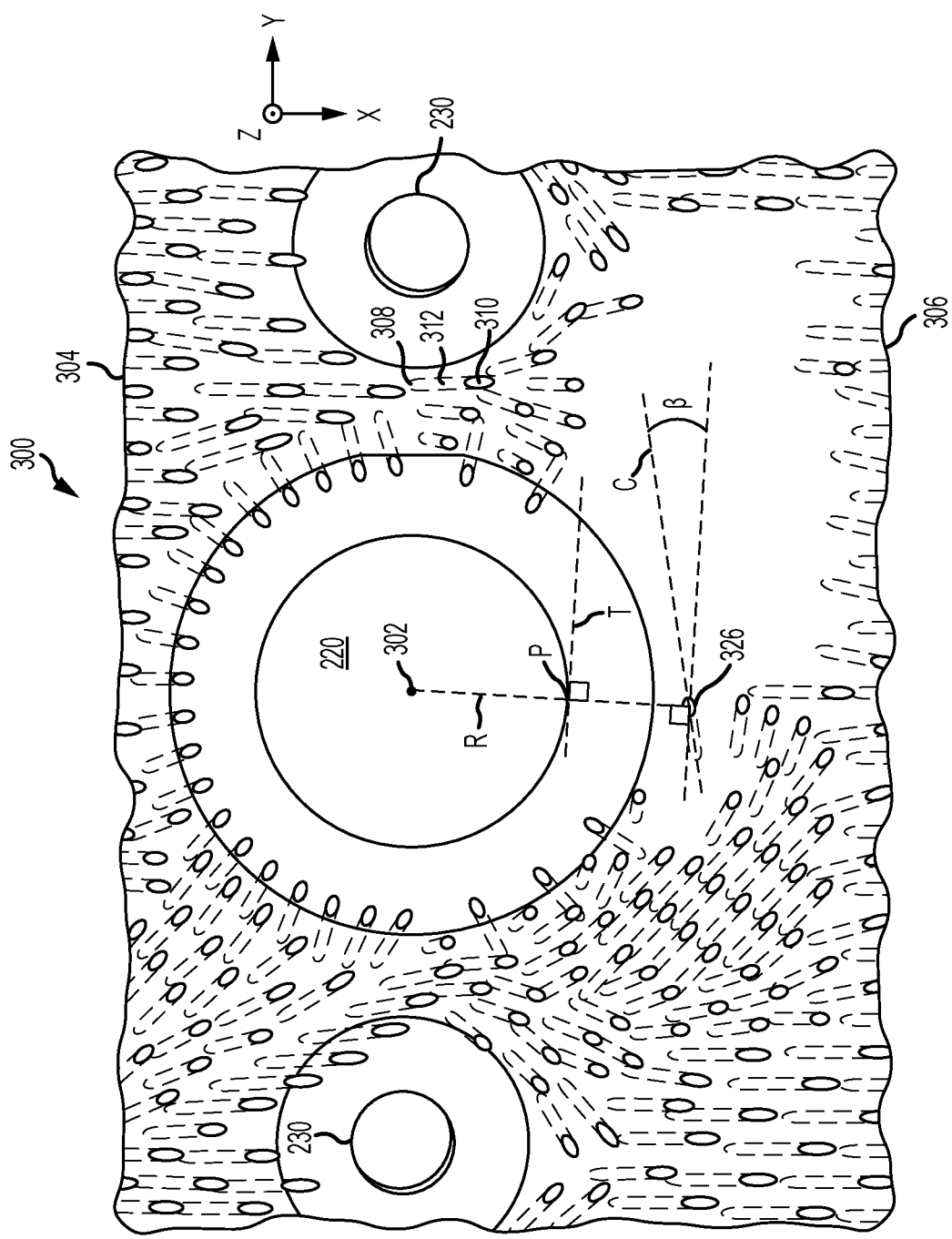
FIG. 3E illustrates a section of a combustor panel with the hot surface translucent for clarity, in accordance with various embodiments.

The second group 316 of the plurality of film cooling holes 240 is arranged relatively between the first group 314. In various embodiments, the second group 316 may be arranged relatively between the second set holes 322 (i.e., the downstream holes of the first group 314). With particular reference to FIG. 3E, panel 200 showing details of a pattern of film cooling holes 240 is illustrated as flattened with hot surface 200H, rendered translucent to reveal the structure of film cooling holes 240 and with some film cooling holes 240 omitted for the sake of clarity. The second group 316 film cooling holes have a second outlet angle approximately perpendicular to the first outlet angle of the proximate second set holes 322. Stated another way, the second group 316 film cooling holes have a second outlet angle 3 oriented in a circumferential direction relatively toward a tangent T to a proximate point P on the circumference of the major dilution hole 220. In various embodiments, the second outlet angle may deviate from the tangent by not more than 25°. In various embodiments, 80% of the second group 316 film cooling holes have angle β not more than 25°. In various embodiments, the second group 316 of film cooling holes may be bisected and relatively symmetric about the X-axis such that respectively opposing film cooling hole outlet flow vectors of the second group 316 are directed relatively toward one another.

In various embodiments, the second group 316 may further comprise third set holes 324 and fourth set holes 326. The third set holes 324 are located radially outward of the second set holes 322 and relatively circumferentially between the second set holes 322 and the fourth set holes 326. The third set holes may have a surface angle between 25° and 65°. The fourth set holes 326 are located radially outward of the third set holes. The fourth set holes may have a surface angle between 20° and 70° degrees.

In various embodiments, the third group 318 of the plurality of film cooling holes is downstream of the second group 316 and comprises rows of opposing film cooling holes substantially mirrored about X-axis. The third group 318 may be defined by fifth set holes 328 arranged radially outward of the fourth set holes 326 of the second group 316 and oriented in a circumferential direction relatively toward a tangent to a proximate point on the circumference of the major dilution hole 220 and further defined by subsequent sets of holes (i.e., a sixth set, a seventh set, an Nth set 330) each radially outward of the respectively previous set and characterized by a gradual turning of the respective outlet angle from the respective tangent toward the vector of the primary flow (i.e., the downstream direction along the X-axis).

In various embodiments, patterns of film cooling holes 240 about major dilution holes 220 and/or minor dilution holes 230 illustrated collectively in FIGS. 2B through 3C (referred to collectively as "illustrated dilution holes of the present disclosure") are illustrated and described for exemplary purposes. Features of the illustrated dilution holes of the present disclosure may be used in any combination with one another in various embodiments comprising similar features. Illustrated dilution holes of the present disclosure may increase thermal performance of combustor panels at lower flow levels and thus enable redistribution of cooling to other locations of combustor panels for improved durability and combustor performance. Illustrated dilution holes of the present disclosure may also improve combustor module durability to extend engine-component life. The illustrated dilution holes of the present disclosure may be formed by subtractive manufacturing such as, for example, laser drilling, electrode discharge machining, waterjet drilling, and/or the like. Additive manufacturing technology may also enable generation of the illustrated dilution holes of the present disclosure to directly produce finished combustor panels with the film cooling holes formed integrally within.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosures.

The scope of the disclosures is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiment Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A combustor panel, comprising:
   a dilution hole;

a plurality of film cooling holes, wherein each of the film cooling holes in the plurality of film cooling holes comprise an inlet and an outlet, wherein the outlet is defined by a major axis and a minor axis, wherein the major axis is longer than the minor axis;

a first group of the plurality of film cooling holes arranged circumferentially about the dilution hole, the first group of the plurality extending to encircle an upstream side and a downstream side of the dilution hole, wherein the major axis of each of the outlets of the film cooling holes of the first group are oriented radially toward a center of the dilution hole; and a second group of the plurality of film cooling holes arranged radially, with respect to the center of the dilution hole, outward of the first group and relatively circumferentially between the first group, wherein each of the first group of the plurality of film cooling holes and the second group of the plurality of film cooling holes comprise more than one film cooling hole, wherein each of the outlets of the film cooling holes of the first group have a first outlet angle, defined in a plane perpendicular to the centerline of the dilution hole, between the major axis of the outlet and a radius extending from the centerline of the dilution hole to the point of intersection of the major axis and the minor axis of the outlet, wherein the first outlet angle is not more than 25° away from the radius extending from the centerline of the dilution hole, wherein each of the outlets of the second group of the plurality of film cooling holes are arranged in an arcuate segment extending about the center of the dilution hole and downstream thereof, wherein each of the outlets of the film cooling holes of the second group having a second outlet angle, defined in a plane perpendicular to the centerline of the dilution hole, between the major axis of the outlet and a tangent, at the point of intersection of the major axis and the minor axis of the outlet, to the radius extending from the centerline of the dilution hole to the point of intersection of the major axis and the minor axis of the outlet, wherein the second outlet angle is not more than 25° away from the tangent.

2. The combustor panel of claim 1, wherein the first group further comprises first set holes upstream of the dilution hole and second set holes downstream of the dilution hole characterized in that the first set holes have a greater surface concentration than the second set holes, wherein each of the first set holes and the second set holes comprise more than one film cooling hole.

3. The combustor panel of claim 1, wherein the first group further comprises first set holes on the upstream side of the dilution hole and second set holes on the downstream side of the dilution hole, wherein the second group of the plurality of film cooling holes are arranged relatively between the second set holes, each of the plurality of film cooling holes of the second group having a second outlet angle oriented in a circumferential direction relatively toward a tangent to a proximate point on a circumference of the dilution hole, wherein each of the first set holes and the second set holes comprise more than one film cooling hole.

4. The combustor panel of claim 3, wherein 80% of the outlets of the film cooling holes of the second group have the second outlet angle not more than 25° away from the tangent of the proximate point.

5. The combustor panel of claim 4, wherein the second group of the plurality of film cooling holes comprises third set holes and fourth set holes, wherein the third set holes are located radially outward of the first set holes and circumferentially between the second set holes and the fourth set holes, wherein the second set holes have a first surface angle between 20° and 75°, wherein the third set holes have a second surface angle between 20° and 65°, and wherein the fourth set holes have a third surface angle between 20° and 70°, wherein each of the third set holes and the fourth set holes comprise more than one film cooling hole.

6. The combustor panel of claim 3, further comprising a third group of the plurality of film cooling holes arranged downstream of the second group comprising fifth set holes arranged radially outward of the second group and oriented in a circumferential direction relatively toward the respective tangent of the respective proximate point on the circumference of the dilution hole, wherein the third group further comprises a plurality of downstream set holes each radially outward of the respectively upstream set holes, wherein each of the downstream set holes are characterized by a gradual turning of the respective outlet angle from the respective tangent toward a downstream direction, wherein each of the third group of the plurality of film cooling holes and the fifth set holes comprise more than one film cooling hole.

7. A combustor assembly comprising:

an inner annular wall;

an outer annular wall about the inner annular wall;

a dome joining the inner annular wall and the outer annular wall, wherein each of the inner annular wall and the outer annular wall comprise a hot surface defining a combustion chamber therebetween; and a dilution hole through the hot surface in fluid communication with a respective cold surface;

a plurality of film cooling holes, wherein each of the film cooling holes in the plurality of film cooling holes comprise an inlet on the respective cold surface in fluid communication with an outlet on the respective hot surface, wherein the outlet is defined by a major axis and a minor axis, wherein the major axis is longer than the minor axis;

a first group of the plurality of film cooling holes arranged circumferentially about the dilution hole, the first group of the plurality extending to encircle an upstream side and a downstream side of the dilution hole, wherein the major axis of each of the outlets of the film cooling holes of the first group are oriented radially toward a center of the dilution hole; and a second group of the plurality of film cooling holes arranged radially, with respect to the center of the dilution hole, outward of the first group and relatively circumferentially between the first group, wherein each of the first group of the plurality of film cooling holes and the second group of the plurality of film cooling holes comprise more than one film cooling hole, wherein each of the outlets of the film cooling holes of the first group have a first outlet angle, defined in a plane perpendicular to the centerline of the dilution hole, between the major axis of the outlet and a radius extending from the centerline of the dilution hole to the point of intersection of the major axis and the minor axis of the outlet, wherein the first outlet angle is not more than 25° away from the radius extending from the centerline of the dilution hole, wherein each of the outlets of the second group of the plurality of film cooling holes are arranged in an arcuate segment extending about the center of the dilution hole and downstream thereof, wherein each of the outlets of the film cooling holes of the second group having a second outlet angle, defined in a plane perpendicular to the centerline of the dilution hole, between the major axis of the outlet and a tangent, at the point of intersection of the major axis and the minor axis of the outlet, to the radius extending from the centerline of the dilution hole to the point of intersection of the major axis and the minor axis of the outlet, wherein the second outlet angle is not more than 25° away from the tangent.

8. The combustor assembly of claim 7, wherein the first group further comprises first set holes upstream of the dilution hole and second set holes downstream of the dilution hole characterized in that the first set holes have a greater surface concentration than the second set holes,
wherein each of the first set holes and the second set holes comprise more than one film cooling hole.

9. The combustor assembly of claim 7, wherein the first group further comprises first set holes upstream of the dilution hole and second set holes downstream of the dilution hole wherein the second group of the plurality of film cooling holes are arranged relatively between the second set holes, each of the plurality of film cooling holes of the second group having a second outlet angle oriented in a circumferential direction relatively toward a tangent to a proximate point on a circumference of the dilution hole,
wherein each of the first set holes and the second set holes comprise more than one film cooling hole.

10. The combustor assembly of claim 9, wherein 80% of the outlets of the film cooling holes of the second group have the second outlet angle not more than 25° away from the tangent of the proximate point.

11. The combustor assembly of claim 10, wherein the second group of the plurality of film cooling holes comprises third set holes and fourth set holes, wherein the third set holes are located radially outward of the first set holes and circumferentially between the second set holes and the fourth set holes, wherein the second set holes have a first surface angle between 20° and 75°, wherein the third set holes have a second surface angle between 25° and 65°, and wherein the fourth set holes have a third surface angle between 20° and 70°,
wherein each of the third set holes and the fourth set holes comprise more than one film cooling hole.

12. The combustor assembly of claim 9, further comprising a third group of the plurality of film cooling holes arranged downstream of the second group comprising fifth set holes arranged radially outward of the second group and oriented in a circumferential direction relatively toward the respective tangent of the respective proximate point on the circumference of the dilution hole, wherein the third group further comprises a plurality of downstream set holes each radially outward of the respectively upstream set holes, wherein each of the downstream set holes are characterized by a gradual turning of the respective outlet angle from the respective tangent toward a downstream direction,
wherein each of the third group of the plurality of film cooling holes and the fifth set holes comprise more than one film cooling hole.

13. A gas turbine engine comprising:
a compressor section configured to compress a gas;
a combustor section aft of the compressor section and configured to combust the gas, wherein the combustor section comprises a combustor panel comprising:
a dilution hole;
a plurality of film cooling holes, wherein each of the film cooling holes in the plurality of film cooling holes comprise an inlet and an outlet, wherein the outlet is defined by a major axis and a minor axis, wherein the major axis is longer than the minor axis;
a first group of the plurality of film cooling holes arranged circumferentially about the dilution hole, the first group of the plurality extending to encircle an upstream side and a downstream side of the dilution hole, wherein the major axis of each of the outlets of the film cooling holes of the first group are oriented radially toward a center of the dilution hole; and
a second group of the plurality of film cooling holes arranged radially, with respect to the center of the dilution hole, outward of the first group and relatively circumferentially between the first group,
wherein each of the first group of the plurality of film cooling holes and the second group of the plurality of film cooling holes comprise more than one film cooling hole
wherein each of the outlets of the film cooling holes of the first group have a first outlet angle, defined in a plane perpendicular to the centerline of the dilution hole, between the major axis of the outlet and a radius extending from the centerline of the dilution hole to the point of intersection of the major axis and the minor axis of the outlet, wherein the first outlet angle is not more than 25° away from the radius extending from the centerline of the dilution hole,
wherein each of the outlets of the second group of the plurality of film cooling holes are arranged in an arcuate segment extending about the center of the dilution hole and downstream thereof,
wherein each of the outlets of the film cooling holes of the second group having a second outlet angle, defined in a plane perpendicular to the centerline of the dilution hole, between the major axis of the outlet and a tangent, at the point of intersection of the major axis and the minor axis of the outlet, to the radius extending from the centerline of the dilution hole to the point of intersection of the major axis and the minor axis of the outlet, wherein the second outlet angle is not more than 25° away from the tangent.

14. The gas turbine engine of claim 13, wherein the first group further comprises first set holes upstream of the dilution hole and second set holes downstream of the dilution hole characterized in that the first set holes have a greater surface concentration than the second set holes,
wherein each of the first set holes and the second set holes comprise more than one film cooling hole.

15. The gas turbine engine of claim 13, wherein the first group further comprises first set holes upstream of the dilution hole and second set holes downstream of the dilution hole, wherein the second group of the plurality of film cooling holes are arranged relatively between the second set holes,
wherein each of the first set holes and the second set holes comprise more than one film cooling hole.

16. The gas turbine engine of claim 15, wherein the second group of the plurality of film cooling holes comprises third set holes and fourth set holes, wherein the third set holes are located radially outward of the first set holes and circumferentially between the second set holes and the fourth set holes, wherein the second set holes have a first surface angle between 20° and 75°, wherein the third set holes have a second surface angle between 25° and 65°, and wherein the fourth set holes have a third surface angle between 20° and 70°, wherein each of the third set holes and the fourth set holes comprise more than one film cooling hole.

17. The gas turbine engine of claim 15, further comprising a third group of the plurality of film cooling holes arranged downstream of the second group comprising fifth set holes arranged radially outward of the second group and oriented in a circumferential direction relatively toward the respective tangent of the respective proximate point on the circumference of the dilution hole, wherein the third group further comprises a plurality of downstream set holes each radially outward of the respectively upstream set holes, wherein each of the downstream set holes are characterized by a gradual turning of the respective outlet angle from the respective tangent toward a downstream direction, wherein each of the third group of the plurality of film cooling holes and the fifth set holes comprise more than one film cooling hole.

\* \* \* \* \*